United States Patent
Wang (10) Patent No.: US 11,120,214 B2
(45) Date of Patent: Sep. 14, 2021

(54) CORPUS GENERATING METHOD AND APPARATUS, AND HUMAN-MACHINE INTERACTION PROCESSING METHOD AND APPARATUS

(71) Applicant: ALIBABA GROUP HOLDING LIMITED, Grand Cayman (KY)

(72) Inventor: Xiaojun Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 165 days.

(21) Appl. No.: 16/457,372

(22) Filed: Jun. 28, 2019

(65) Prior Publication Data

US 2020/0004786 A1    Jan. 2, 2020

(30) Foreign Application Priority Data

Jun. 29, 2018    (CN) .......................... 201810712333.5

(51) Int. Cl.
| | | |
|---|---|---|
| G06F 40/20 | (2020.01) | |
| G06F 16/9032 | (2019.01) | |
| G06F 40/44 | (2020.01) | |
| G06F 40/289 | (2020.01) | |

(52) U.S. Cl.
CPC ........ *G06F 40/20* (2020.01); *G06F 16/90332* (2019.01); *G06F 40/289* (2020.01); *G06F 40/44* (2020.01)

(58) Field of Classification Search
None
See application file for complete search history.

(56) References Cited

U.S. PATENT DOCUMENTS

| | | |
|---|---|---|
| 5,325,298 A | 6/1994 | Gallant |
| 6,137,911 A | 10/2000 | Zhilyaev |
| 6,523,026 B1 | 2/2003 | Gillis |
| 9,183,203 B1 | 11/2015 | Tuchman et al. |
| 9,703,858 B2 | 6/2017 | Franceschini et al. |
| 9,792,275 B2 | 10/2017 | Panemangalore et al. |
| 10,073,830 B2 | 9/2018 | Walla et al. |
| 10,192,545 B2 | 1/2019 | Levit et al. |
| 10,255,323 B1 * | 4/2019 | Guo .................... G06F 16/2237 |

(Continued)

FOREIGN PATENT DOCUMENTS

| | | |
|---|---|---|
| CN | 103279556 B | 8/2016 |
| CN | 107958014 A | 4/2018 |

(Continued)

OTHER PUBLICATIONS

Jegou, Herve, Matthijs Douze, and Cordelia Schmid. "Product quantization for nearest neighbor search." IEEE transactions on pattern analysis and machine intelligence 33.1 (2010): 117-128. (Year: 2010).*

(Continued)

*Primary Examiner* — Douglas Godbold (57) ABSTRACT

Embodiments of the present specification provide a corpus generating method and apparatus, and a human-machine interaction processing method and apparatus, wherein the corpus generating method comprises: generating a corpus vector according to corpus content; determining a vector type of the corpus vector; and generating, according to the vector type and the corpus vector, a corpus having an inverted chain index.

15 Claims, 5 Drawing Sheets

(56) References Cited

U.S. PATENT DOCUMENTS

| | | |
|---|---|---|
| 2005/0149494 A1 | 7/2005 | Lindh et al. |
| 2006/0242135 A1* | 10/2006 | Weare ................. G06F 16/9535 |
| 2012/0209847 A1* | 8/2012 | Rangan ............... G06F 16/3347 |
| | | 707/737 |
| 2015/0356088 A1* | 12/2015 | Berkhin ............ G06F 16/24578 |
| | | 707/748 |
| 2016/0062731 A1* | 3/2016 | Lin ..................... G06F 16/5866 |
| | | 707/742 |
| 2017/0083610 A1* | 3/2017 | Wang .................... G06F 16/334 |
| 2017/0262449 A1 | 9/2017 | Venkataraman et al. |
| 2018/0053234 A1* | 2/2018 | Sun ........................ G06F 40/237 |
| 2018/0082197 A1 | 3/2018 | Aravamudan et al. |
| 2018/0107983 A1 | 4/2018 | Mir Ghaderi et al. |
| 2018/0121443 A1 | 5/2018 | Bao et al. |
| 2018/0341805 A1* | 11/2018 | Jain ......................... G06F 17/00 |
| 2019/0179858 A1* | 6/2019 | Douze .................. G06F 16/951 |
| 2019/0392058 A1* | 12/2019 | Konow Krause ........................... G06F 16/24578 |
| 2020/0226137 A1* | 7/2020 | Zhao .................. G06F 16/2237 |

FOREIGN PATENT DOCUMENTS

| | | |
|---|---|---|
| CN | 108038105 A | 5/2018 |
| CN | 108763217 A | 11/2018 |
| CN | 108845986 A | 11/2018 |
| CN | 109964224 A | 7/2019 |
| EP | 0996927 A1 | 5/2000 |
| EP | 1466273 B1 | 4/2010 |

OTHER PUBLICATIONS

Written Opinion of the International Searching Authority and International Search Report for PCT Application No. PCT/US2019/039942 dated Sep. 19, 2019 (8 pages).

* cited by examiner

CORPUS GENERATING METHOD AND APPARATUS, AND HUMAN-MACHINE INTERACTION PROCESSING METHOD AND APPARATUS

CROSS-REFERENCE TO RELATED APPLICATIONS

The present application is based on and claims priority to the Chinese Patent Application No. 201810712333.5, filed on Jun. 29, 2018 and entitled "Corpus Generating Method and Apparatus, and Human-machine Interaction Processing Method and Apparatus," which is incorporated herein by reference in its entirety.

TECHNICAL FIELD

Embodiments of the application relate to the field of computer technologies, and in particular, to a corpus generating method and apparatus, and a human-machine interaction processing method and apparatus.

BACKGROUND

Question answering systems use natural language understanding as the core technology to enable a computer and the like to understand and respond to users' queries, and thus question and answer dialogues can be achieved between the computer and the users.

Different dimensions are applied in the industry to classify question answering systems. According to the content dimension, question answering systems may be classified into structured data question answering systems, non-structured data question answering systems, and question-answer pair-based question answering systems. From the technical perspective, on the other hand, question answering systems may typically be classified into retrieval based question answering systems and generative question answering systems. Retrieval based question answering systems construct an information retrieval system on a large-scale dialogue data set, and reasonable responses to user queries are obtained by establishing an effective quantitative model of question matching and question and answer correlation degrees; as for generative question answering systems, an End-to-End deep learning model is constructed, and semantic association between queries and responses is automatically learned from massive dialogue data, thereby achieving automatic generation of responses to user queries.

The intelligence and response accuracy of generative question answering systems are limited by the deep learning model and the quantity and quality of samples used for training the deep learning model. Since good deep learning models applicable on question answering systems have not been able to be developed according to current development technologies, this type of question answering system does not have high response accuracy.

Existing question answering systems are primarily retrieval based question answering systems. In use of this type of question answering systems, after a question input by a user is obtained, a candidate question set is recalled from the corpus using a text inverting method. Questions in the candidate question set are typically questions identical with or similar to the question input by the user. Subsequently, the closest question is determined from the candidate question set, an answer corresponding to the closest question is used as a response to complete answering the user's question. This type of question answering systems has advantages such as simple implementation and high accuracy, but is highly dependent on the corpus and requires support by a very large corpus with abundant information. If no word having any text co-occurrence attributes appears in the corpus, candidate questions are impossible to be recalled even when the expressed semantics of the question input by the user and the candidate questions are the same. As a result, some answers with high accuracy cannot be recalled due to the lack of text co-occurrence attributes, which leads to losses. On the other hand, multiple pieces of data (e.g., texts) need to be stored for the same semantics in the corpus, leading to high storage burden and increased storage cost.

SUMMARY

In view of this, embodiments of the present specification provide a corpus generating method and apparatus, and a human-machine interaction processing method and apparatus to solve the problem that question answering systems using existing corpora do not achieve a good effect.

According to a first aspect of the embodiments of the present specification, a corpus generating method is provided. The corpus generating method may comprise: generating a corpus vector according to corpus content; determining a vector type of the corpus vector; and generating, according to the vector type and the corpus vector, a corpus having an inverted chain index.

In some embodiments, the generating a corpus vector according to corpus content may comprise: determining a word segmentation result of the corpus content, the word segmentation result including a plurality of words; determining word vectors corresponding to the words in the word segmentation result; and generating the corpus vector corresponding to the corpus content according to the word vectors corresponding to the words in the word segmentation result.

In some embodiments, the determining word vectors corresponding to the words in the word segmentation result may comprise: searching a preset word vector library to determine the word vectors corresponding to the words in the word segmentation result.

In some embodiments, the generating the corpus vector corresponding to the corpus content according to the word vectors corresponding to the words in the word segmentation result may comprise: summing the word vectors corresponding to the words in the word segmentation result to generate the corpus vector.

In some embodiments, the determining a vector type of the corpus vector may comprise: determining the vector type of the corpus vector through Product Quantization.

In some embodiments, the method may further comprise: generating a plurality of corpus vectors. In addition, the determining the vector type of the corpus vector through Product Quantization may comprise: dividing each corpus vector into k sub-vectors, and forming k sub-vector sets, wherein k is a positive integer equal to or greater than one; clustering each of the sub-vector sets using a clustering algorithm, and generating m class centers for each of the sub-vector sets, wherein m is a positive integer equal to or greater than one; determining a class center to which each sub-vector of each corpus vector belongs; and determining a vector type of the corpus vector according to the class centers to which the k sub-vectors of the each corpus vector belong.

In some embodiments, the generating, according to the vector type and the corpus vector, a corpus having an inverted chain index may comprise: generating the corpus having the inverted chain index according to record data, each piece of the record data including corpus vectors having a same vector type and the corresponding vector type.

In some embodiments, the method may further comprise: generating an incremental corpus vector according to incremental corpus content; generating an incremental corpus having a tile index according to the incremental corpus vector; and forming a corpus based on the corpus and the incremental corpus.

According to a second aspect of the embodiments of the present specification, a corpus generating apparatus is provided. The corpus generating apparatus may comprise: one or more processors and one or more non-transitory computer-readable memories coupled to the one or more processors and configured with instructions executable by the one or more processors to cause the apparatus to perform operations comprising: generating a corpus vector according to corpus content; determining a vector type of the corpus vector; and generating, according to the vector type and the corpus vector, a corpus having an inverted chain index.

According to a third aspect of the embodiments of the present specification, a human-machine interaction processing method is provided. The human-machine interaction processing method may comprise: generating a human-machine interaction input vector according to a human-machine interaction input; determining, according to the human-machine interaction input vector, n closest corpus vectors from a corpus, wherein n is a positive integer equal to or greater than one; determining a confidence level of corpus content corresponding to each of the n closest corpus vectors, and determining target corpus content according to the confidence levels; and generating a response corresponding to the human-machine interaction input according to the target corpus content.

In some embodiments, the operations may further comprise: determining, according to the human-machine interaction input vector, a first number of closest corpus vectors from the corpus; and determining, according to the human-machine interaction input vector, a second number of closest incremental corpus vectors from an incremental corpus, wherein the first number and the second number both are a positive integer equal to or greater than one, and a sum of the first number and the second number is n.

In some embodiments, the determining, according to the human-machine interaction input vector, a first number of closest corpus vectors from the corpus may comprise: dividing the human-machine interaction input vector into k sub-vectors; determining class centers to which the k sub-vectors of the human-machine interaction input vector belong using a clustering algorithm, and determining a vector type of the human-machine interaction input vector according to the class centers of the k sub-vectors; and searching the inverted chain index of the corpus according to the vector type of the human-machine interaction input vector to determine the first number of closest corpus vectors.

In some embodiments, the determining, according to the human-machine interaction input vector, a second number of closest incremental corpus vectors from the incremental corpus may comprise: searching a tile index of the incremental corpus according to the human-machine interaction input vector to determine the second number of closest incremental corpus vectors.

In some embodiments, the determining a confidence level of corpus content corresponding to each of the n closest corpus vectors, and determining target corpus content according to the confidence levels may comprise: determining, according to the n closest corpus vectors, n pieces of corpus content each corresponding to one of the n closest corpus vectors; calculating a text granularity similarity and keyword matching degree between each of the n pieces of corpus content and the human-machine interaction input data, respectively; determining the confidence level of each of the n pieces of corpus content according to the text granularity similarity and keyword matching degree; and determining the corpus content having the highest confidence level as the target corpus content.

According to a fourth aspect of the embodiments of the present specification, a human-machine interaction processing apparatus is provided. The human-machine interaction processing apparatus may comprise: one or more processors and one or more non-transitory computer-readable memories coupled to the one or more processors and configured with instructions executable by the one or more processors to cause the system to perform operations comprising: generating a human-machine interaction input vector according to a human-machine interaction input; determining, according to the human-machine interaction input vector, n closest corpus vectors from a preset corpus, wherein n is a positive integer equal to or greater than one, and wherein the preset corpus comprises a corpus; determining a confidence level of corpus content corresponding to each of the n closest corpus vectors, and determining target corpus content according to the confidence levels; and generating a response corresponding to the human-machine interaction input according to the target corpus content.

According to a fifth aspect of the embodiments of the present specification, an electronic device is provided. The electronic device may comprise: a processor, a memory, a communication interface, and a communication bus, the processor, the memory, and the communication interface communicating with one another via the communication bus, the memory being configured to store executable instructions causing the processor to perform operations corresponding to the corpus generating method according to the first aspect, alternatively the memory being configured to store executable instructions causing the processor to perform operations corresponding to the human-machine interaction processing method according to the third aspect.

The corpus generating solutions provided by the embodiments of the present specification may generate a corpus having an inverted chain index, achieving higher search efficiency and improving a response speed of question answering systems using this corpus due to the inverted chain index structure of the corpus and through storing corpus vectors having the same vector types into groups (clusters). In addition, due to vectorization of the corpus content when generating the corpus vectors, semantic similarity in the corpus content can be well reflected when vector types of the corpus vectors are determined, thereby fundamentally solving the problem in current technologies that semantic similarity cannot be reflected in corpus content that do not have text co-occurrence attributes, and improving answer accuracy of question answering systems subsequently using this corpus.

BRIEF DESCRIPTION OF THE DRAWINGS

To more clearly describe the technical solutions in the embodiments of the present specification or in current technologies, the accompanying drawings to be used in the embodiments or current technologies will be briefly described. Obviously, the accompanying drawings in the description below are merely some embodiments of the present specification, and one of ordinary skill in the art may obtain other drawings according to the accompanying drawings.

FIG. 1 is a flow chart of a corpus generating method according to some embodiments of the present specification.

DETAILED DESCRIPTION

To enable one of ordinary skill in the art to better understand the technical solutions in the embodiments of the present specification, the technical solutions in the embodiments of the present specification will be clearly and completely described below with reference to the accompanying drawings in the embodiments of the present specification. It is obvious that the described embodiments are merely some, but not all, embodiments of the present specification. On the basis of the embodiments of the present specification, all other embodiments obtainable by one of ordinary skill in the art shall fall within the scope of the embodiments of the present specification.

Figure 1:
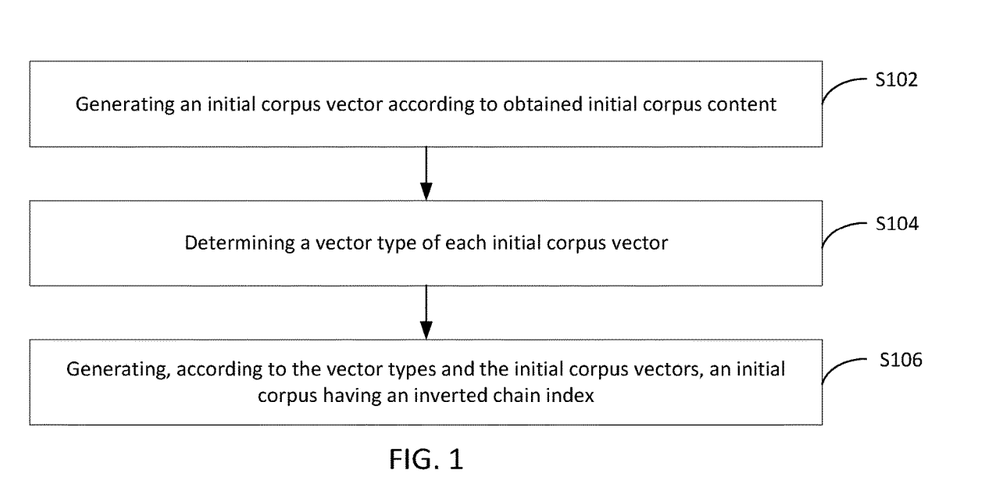

Referring to FIG. 1, a flow chart of a corpus generating method is illustrated according to some embodiments of the present specification. The corpus generating method according to the embodiments comprises the following steps S102-S106.

Step S102: generating an initial corpus vector according to obtained initial corpus content.

Corpus content (which can be referred to as initial corpus content) may include one or more of text data, image data, voice data, and the like that are expressed in the manner of natural language. A corpus vector (which can be referred to as an initial corpus vector) may be a vector corresponding to the initial corpus content.

An initial corpus vector may be generated according to the obtained initial corpus content. For example, a Word2vec algorithm may be used to generate an initial corpus vector according to the initial corpus content; or a BOW (bag-of-word) model may be used to generate an initial corpus vector according to the initial corpus content; or other manners may be uses to generate an initial corpus vector. In some embodiments, multiple initial corpus vectors may be generated based on the obtained initial corpus content.

Step S104: determining a vector type of each initial corpus vector.

A vector type represents a classification of the initial corpus vector, and initial corpus vectors close to each other in distance belong to the same vector type. For initial corpus content, initial corpus vectors generated from initial corpus content with close semantics are close in distance. The initial corpus vectors are classified by using vector types based on this feature, which, on the one hand, can accelerate search and reduce search numbers and times, and on the other hand, can optimize the structure of a generated corpus, reduce the storage space occupied by the corpus, and lower the storage cost.

The vector type of each initial corpus vector may be determined in a proper manner. For example, a first number (e.g., 256) of class center points is preset, each class center point represents a vector type, and the vector type of each initial corpus vector is determined by calculating the distance between each initial corpus vector and each class center point. In some embodiments, the first number may be determined according to practical demands. A higher first number means higher classification accuracy and correspondingly a higher search number, and vice versa.

Step S106: generating, according to the vector types and the initial corpus vectors, an initial corpus having an inverted chain index.

A corpus (which can be referred to as an initial corpus) may be generated according to the vector types and the corpus vectors. To make it more convenient to search the initial corpus, the initial corpus stores each initial corpus vector and its corresponding vector type in an inverted chain index. The inverted chain index is an inverted index according to which records are searched based on an attribute value. Each item in the inverted index comprises an attribute value and one or more addresses of one or more records having this attribute value. During search, a record's location may be determined according to the attribute value. In some embodiments, the attribute value of the inverted chain index may be a vector type, and the addresses of records may be addresses of initial corpus vectors having this vector type.

According to the corpus generating method of the embodiments, an initial corpus having an inverted chain index is generated. Due to the inverted chain index structure and through storing initial corpus vectors having the same vector types into groups (clusters), the storage space occupied by the initial corpus generated according to the corpus generating method is reduced, the search efficiency is improved, and the response speed of question answering systems using this initial corpus may be increased. In addition, due to vectorization of the initial corpus content when generating the initial corpus vectors, semantic similarity in the initial corpus content can be well reflected when vector types of the initial corpus vectors are determined, thereby fundamentally solving the problem in current technologies that semantic similarity cannot be reflected in initial corpus content that do not have text co-occurrence attributes, and improving answer accuracy of question answering systems subsequently using this initial corpus.

The corpus generating method according to the embodiments may be implementable by any proper terminal device or server having data processing capabilities, including but not limited to a mobile terminal, such as a tablet computer, a mobile phone, etc., and a desktop computer.

Figure 2:
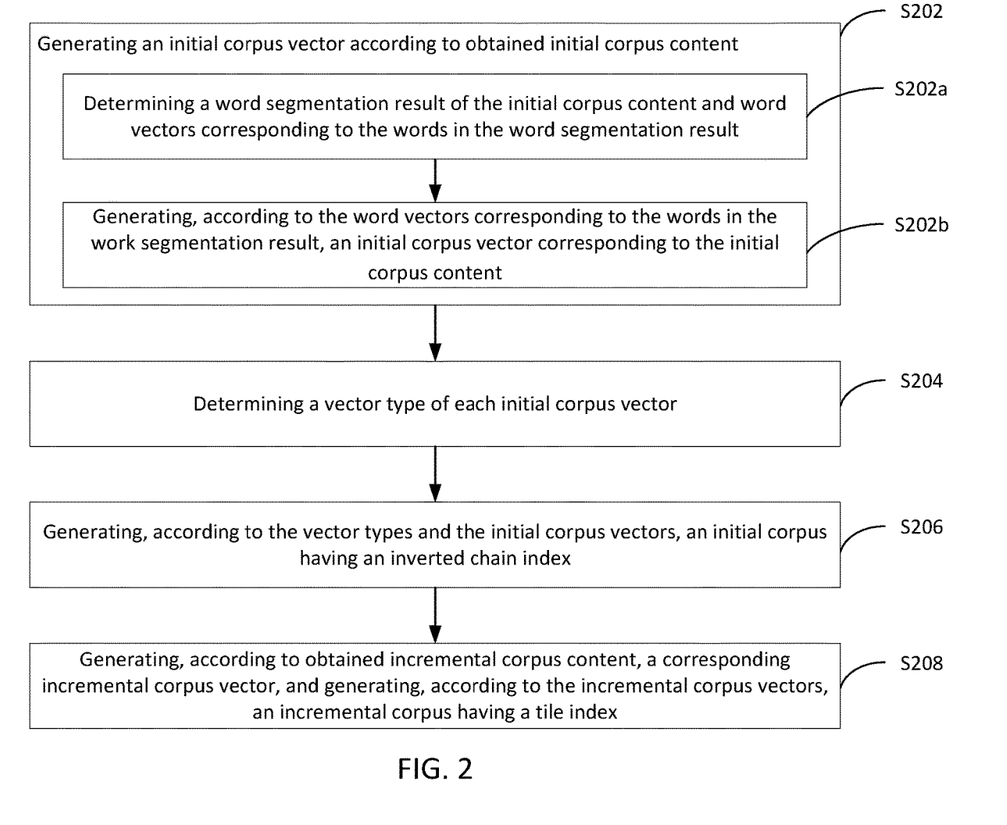
FIG. 2 is a flow chart of a corpus generating method according to other embodiments of the present specification.

Referring to FIG. 2, a flow chart of a corpus generating method is illustrated according to other embodiments of the present specification. The corpus generating method according to the embodiments comprises the following steps S202-S208.

Step S202: generating an initial corpus vector according to obtained initial corpus content.

The initial corpus content may include text data, image data, and/or voice data that are expressed in the manner of natural language. The initial corpus vectors may be vectors corresponding to the initial corpus content.

An initial corpus vector may be generated according to the obtained initial corpus content. For example, a Word2vec algorithm may be used to generate an initial corpus vector according to the initial corpus content; or a BOW (bag-of-Word) model may be used to generate an initial corpus vector according to the initial corpus content; or other manners may be uses to generate an initial corpus vector. In some embodiments, multiple initial corpus vectors may be generated based on the obtained initial corpus content.

To improve the accuracy of question and answer when the corpus generated by the above-described method is used in the subsequent human-machine interaction processing method, the initial corpus vector may generated through the steps S202a to S202b below.

Step S202a: determining a word segmentation result of the initial corpus content and word vectors corresponding to words in the word segmentation result.

As the obtained initial corpus content may be of different types and formats, to facilitate the processing on the initial corpus content that is non-text data such as voice data or video data, the voice data or video data may be converted to text data using a voice recognition tool or algorithm. The text data may be processed by a word segmentation method.

For example, the initial corpus content may be:
Initial corpus content 1: "is Beijing cold today?"
Initial corpus content 2: "what is the degree today?"
Initial corpus content 3: "search on Guge (the Chinese Pinyin of "Google")."
Initial corpus content 4: "search on Google."

Each of the initial corpus content is segmented to generate a corresponding word segmentation result, which may include multiple words. Word segmentation refers to a process in which a sequence of Chinese characters (or a sequence in other languages) is cut or split into individual and independent words.

Any proper word segmentation algorithm or word segmentation tool may be used to segment initial corpus content, such as the StandardAnalyzer word segmentation tool, the ChineseAnalyzer word segmentation tool, the CJKAnalyzer word segmentation tool, and the jieba word segmentation tool.

After the initial corpus content 1 is segmented, the word segmentation result may be "Beijing"|"today"|"cold"|"is".

After the initial corpus content 2 is segmented, the word segmentation result may be "today"|"what"|"degree".

After the initial corpus content 3 is segmented, the word segmentation result may be "search on"|"Guge".

After the initial corpus content 4 is segmented, the word segmentation result may be "search on"|"Google".

When different word segmentation tools or word segmentation algorithms are used to segment the same initial corpus content, the word segmentation results may be different. To improve the accuracy of subsequent processing, removing of stop words may or may not be performed after the initial corpus content has been segmented. Stop words refer to words having no substantial impact on semantics, such as modal particles.

A word vector expresses a word in natural language in a mathematical expression manner. For each word segmentation result, when word vectors corresponding to the words in the word segmentation result are determined, the word vectors may be obtained through a word vector algorithm or may be obtained through searching a word vector library. A word vector library may be a preset library storing corresponding relationships between words and word vectors. For each word in a word segmentation result, a word vector of the word may be obtained by searching in the word vector library.

Step S202b: generating, according to the word vectors corresponding to the words in the word segmentation result, the initial corpus vector corresponding to the initial corpus content.

After the word vectors of the words in each word segmentation result are determined, for each word segmentation result, the word vectors corresponding to the words in the word segmentation result are added together to generate an initial corpus vector corresponding to the initial corpus content.

Step S204: determining a vector type of each initial corpus vector.

A vector type of each initial corpus vector may be determined in a proper manner. For example, Product Quantizer or Product Quantization (PQ) may be used to determine a vector type of each initial corpus vector.

In some embodiments, Product Quantization mainly comprises two processes: a process of grouping and quantizing features and a process of cartesian product of classes. Assuming that there is a data set, a predetermined number "K" of classes is clustered through a K-means algorithm, the target function has the minimum sum of distances between all samples to a class center, and the target function is optimized through iterative calculation to obtain K class centers and classes to which all samples belong.

The determination of a vector type of each initial corpus vector through Product Quantization will be described in detail below.

Each initial corpus vector is divided into k sub-vectors, and k sub-vector sets are formed; each of the sub-vector sets is clustered using a clustering algorithm, and m class centers are generated for each of the sub-vector sets; for each initial corpus vector, a class center is determined to which each sub-vector of the initial corpus vector belongs, and a vector type of the initial corpus vector is determined according to the class centers to which the k sub-vectors of the initial corpus vector belong.

For example, assuming that the initial corpus vector has d dimensions, the initial corpus vector may be divided into k sub-vectors, and each sub-vector has d/k dimensions. For example, d may have a value of 128, k may have a value of 8, and then each sub-vector has 16 dimensions.

If the number of initial corpus vectors is s, then the number of sub-vectors in each sub-vector set is s. In some embodiments, when the k sub-vector sets are formed, the first sub-vectors of the initial corpus vectors form the first sub-vector set, the second sub-vectors of the initial corpus vectors form the second sub-vector set, and so on.

In some embodiments, each of the sub-vector sets is clustered using a clustering algorithm. Clustering algorithms are used to solve the task of grouping a set of objects in such a way that objects in the same group (referred to as a cluster) are more similar to each other than to those in other groups (clusters). In some embodiments, the clustering algorithm may be a K-means algorithm or other clustering algorithms. The number of class centers clustered through the clustering algorithm may be determined according to practical demands. A higher number of class centers means higher classification accuracy and higher amount of calculation, and vice versa.

In some embodiments, for each of the sub-vector sets, m class centers are generated, and m may have a value of 100, 128, 200, 256, 300, 400, 500, 512, etc. There is a total of k sub-vector sets. After each sub-vector set is clustered to obtain m class centers (the total number of class centers may be m*k), for each initial corpus vector, a class center to which each sub-vector of the initial corpus vector belongs may be determined through a K-Nearest Neighbor (KNN) algorithm. For example, to determine a class center to which a first sub-vector of the initial corpus vector (referred to as the target sub-vector) belongs, h sub-vectors (e.g., a value of h is determined according to practical demands) closest to the target sub-vector are searched for in the first sub-vector set (e.g., this set of first sub-vectors refers to a set formed by the first sub-vectors of all initial corpus vectors). Class centers to which the h sub-vectors belong are determined, and the class center having the largest number of sub-vectors is determined from these class centers as the class center of the target sub-vector. For example, assuming h=7, and among the class centers of the h sub-vectors, five sub-vectors belong to the class center 1, one sub-vector belongs to the class center 2, one sub-vector belongs to the class center 3, and then the class center to which the target sub-vector belongs is the class center 1.

In some embodiments, the class center to which each sub-vector of each initial corpus vector belongs may be determined in other manners. For example, distances between each sub-vector and all class centers are calculated, and the class center having the shortest distance to the sub-vector is determined to be the class center of the sub-vector.

After class centers to which k sub-vectors of each initial corpus vector belong are determined, the vector type of the initial corpus vector is determined according to these k class centers.

For example, the class centers of k sub-vectors of an initial corpus vector are class center 1, class center 351, class center 600, class center 855, class center 1011, class center 1450, class center 1650, and class center 2011, respectively, and then the vector type of the initial corpus vector may be recorded as [c1,c351,c600,c855,c1011,c1450,c1650,c2011].

Step S206: generating, according to the vector types and the initial corpus vectors, an initial corpus having an inverted chain index.

In some embodiments, to generate the initial corpus having an inverted chain index, initial corpus vectors having the same vector type and the corresponding vector type are used as one piece of record data of an inverted chain index, and the initial corpus having the inverted chain index is generated according to the record data.

In some embodiments, the record data comprises a keyword and record content data. The keyword in the record data is a vector type. The record content data may comprise an identifier (ID) (e.g., a number) and a storage address of each initial corpus vector having this vector type (or the initial corpus vector itself).

If the initial corpus is applied to question answering systems, the question corpus in the question-answer pair (QA pair) may be used as the initial corpus content to generate an initial corpus by using the corpus generating method. In some other embodiments, the initial corpus may store other initial corpus content.

Step S208: generating, according to obtained incremental corpus content, a corresponding incremental corpus vector, and generating, according to the incremental corpus vectors, an incremental corpus having a tile index.

In some embodiments, this step is an optional step and may be omitted. An incremental corpus refers to a newly added corpus in addition to the initial corpus. In other words, the intersection of corpus content in the incremental corpus and corpus content in the initial corpus is empty. Since the initial corpus has an inverted chain index, clustering and class center calculation may be performed when the inverted chain index is established. When the initial corpus content changes, the initial corpus may perform clustering and class center calculation again for all the content, which will take up tremendous computing power resources. In particular, when corpus addition is performed frequently, the computing power can be wasted. To solve this problem, the initial corpus is updated periodically at a predetermined interval, e.g., 1 day, 2 days, or a week. The corpus content between two adjacent updates is treated as incremental corpus content for generating the incremental corpus. The amount of incremental corpus content is typically far smaller than the amount of initial corpus content.

After the incremental corpus content is obtained, corresponding incremental corpus vectors are generated using such an algorithm as Word2vec or the like, according to the incremental corpus content. Subsequently, the incremental corpus having a tile index is generated according to the incremental corpus vectors. In some embodiments, keywords of the tile index may be the incremental corpus vectors.

If the corpora used in the subsequent human-machine interaction processing method comprise the incremental corpus and the initial corpus, then the incremental corpus and the initial corpus form the preset corpus.

According to the corpus generating method of the embodiments, initial corpus content and incremental corpus content are converted to corresponding initial corpus vectors and incremental corpus vectors respectively. An initial corpus having an inverted chain index is generated according to the initial corpus vectors, and further, an incremental corpus having a tile index may be generated according to the incremental corpus vectors. The initial corpus may greatly save the storage space, and since the initial corpus content is converted to the initial corpus vectors, the accuracy of answers obtained through search in the subsequent process of application in question answering systems can be improved.

The corpus generating method according to the embodiments may be implementable by any proper terminal device or server having data processing capabilities, including but not limited to a mobile terminal, such as a tablet computer, a mobile phone, etc., and a desktop computer.

Figure 3:
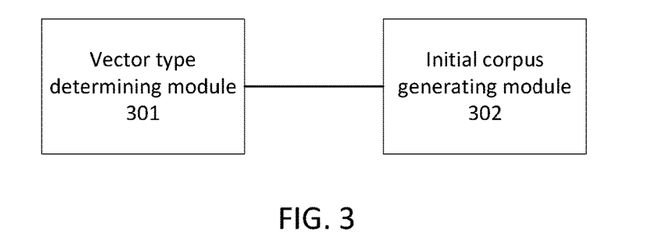
FIG. 3 is a structural block diagram of a corpus generating apparatus according to some embodiments of the present specification.

Referring to FIG. 3, a structural block diagram of a corpus generating apparatus is illustrated according to some embodiments of the present specification. The corpus generating apparatus according to the embodiments comprises: a vector type determining module 301 configured to generate an initial corpus vector according to obtained initial corpus content, and determine a vector type of each initial corpus vector; and an initial corpus generating module 302 configured to generate, according to the vector types and the initial corpus vectors, an initial corpus having an inverted chain index. Embodiments of the corpus generating methods may be referenced for details of such functions of the vector type determining module 301 and the initial corpus generating module 302.

The corpus generating apparatus generates an initial corpus having an inverted chain index. Due to the inverted chain index structure and through storing initial corpus vectors having the same vector types into groups (clusters), the storage space occupied by the initial corpus generated by the corpus generating apparatus is reduced, the search efficiency is higher, and the response speed of question answering systems using this initial corpus may be improved. In addition, due to vectorization of the initial corpus content when generating the initial corpus vectors, semantic similarity in the initial corpus content can be well reflected when vector types of the initial corpus vectors are determined, thereby fundamentally solving the problem in current technologies that semantic similarity cannot be reflected in initial corpus content that do not have text co-occurrence attributes, and improving answer accuracy of question answering systems subsequently using this initial corpus.

Figure 4:
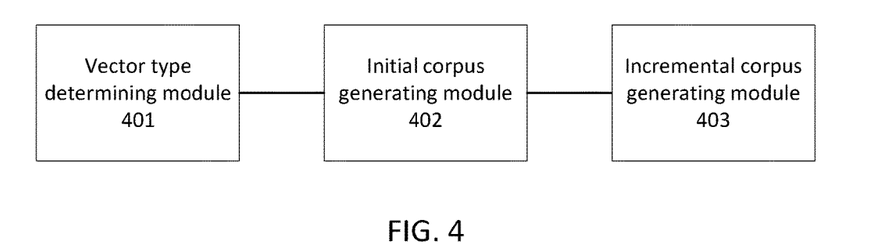
FIG. 4 is a structural block diagram of a corpus generating apparatus according to other embodiments of the present specification.

Referring to FIG. 4, a structural block diagram of a corpus generating apparatus is illustrated according to other embodiments of the present specification. The corpus generating apparatus according to the embodiments comprises: a vector type determining module 401 configured to generate an initial corpus vector according to obtained initial corpus content, and determine a vector type of each initial corpus vector; and an initial corpus generating module 402 configured to generate, according to the vector types and the initial corpus vectors, an initial corpus having an inverted chain index.

In some embodiments, the vector type determining module 401 is configured to determine a word segmentation result of the initial corpus content and word vectors corresponding to the words in the word segmentation result; generate an initial corpus vector according to the word vectors corresponding to the words in the word segmentation result, and determine a vector type of each initial corpus vector.

In some embodiments, the vector type determining module 401 is configured to determine a word segmentation result of the initial corpus content, and search a preset word vector library to determine word vectors corresponding to the words in the word segmentation result; generate an initial corpus vector according to the word vectors corresponding to the words in the word segmentation result, and determine a vector type of each initial corpus vector.

In some embodiments, the vector type determining module 401 is configured to determine a word segmentation result of the initial corpus content, and word vectors corresponding to the words in the word segmentation result; for the word segmentation result, sum the word vectors corresponding to the words in the word segmentation result to generate an initial corpus vector corresponding to the initial corpus content, and determine a vector type of each initial corpus vector.

In some embodiments, when determining a vector type of each initial corpus vector, the vector type determining module 401 is configured to determine the vector type of each initial corpus vector through Product Quantization.

In some embodiments, the vector type determining module 401 is configured to generate an initial corpus vector according to the obtained initial corpus content, divide each initial corpus vector into k sub-vectors, and form k sub-vector sets; cluster each of the sub-vector sets using a clustering algorithm, and generate m class centers for each of the sub-vector sets; for each initial corpus vector, determine a class center to which each sub-vector of the initial corpus vector belongs; and determine a vector type of the initial corpus vector according to the class centers to which the k sub-vectors of the initial corpus vector belong.

In some embodiments, the initial corpus generating module 402 is configured to use initial corpus vectors having the same vector type and the corresponding vector type as a piece of record data of an inverted chain index to generate the initial corpus having the inverted chain index according to the record data.

In some embodiments, the apparatus further comprises: an incremental corpus generating module 403 configured to generate a corresponding incremental corpus vector according to an obtained incremental corpus content, and generate, according to the incremental corpus vectors, an incremental corpus having a tile index, the initial corpus and the incremental corpus forming a corpus.

The corpus generating apparatus may convert initial corpus content and incremental corpus content to corresponding initial corpus vectors and incremental corpus vectors respectively, generate an initial corpus having an inverted chain index according to the initial corpus vectors, and may further generate an incremental corpus having a tile index according to the incremental corpus vectors. The initial corpus may greatly save the storage space, and since the apparatus converts the initial corpus content to the initial corpus vectors, the accuracy of answers obtained through search in the subsequent process of application in question answering systems can be improved.

Figure 5:
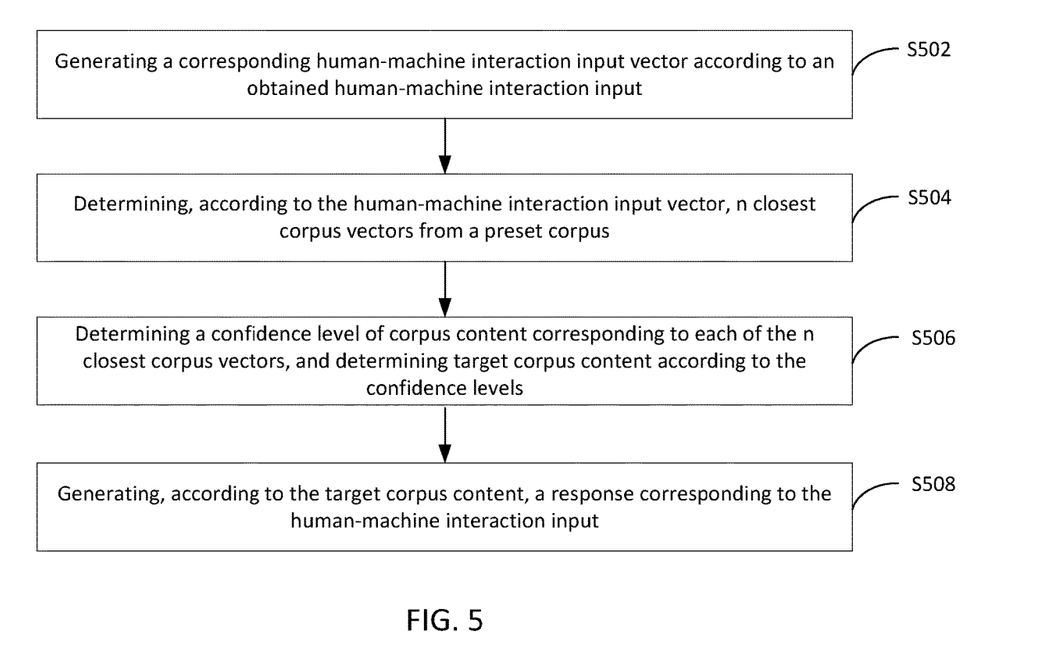
FIG. 5 is a flow chart of a human-machine interaction processing method according to some embodiments of the present specification.

Referring to FIG. 5, a flow chart of steps in a human-machine interaction processing method is illustrated according to some embodiments of the present specification. The human-machine interaction processing method is used to implement intelligent dialogues between a device and a person. For example, a chat robot chats with a user, an intelligent assistant interacts with a user, etc. The human-machine interaction processing method may be used as a Question and Answer method in question answering systems. The human-machine interaction processing method according to the embodiments comprises the following steps S502-S508.

Step S502: generating a corresponding human-machine interaction input vector according to an obtained human-machine interaction input.

For example, when a user performs Question and Answer activities with a device in question answering systems, a user question (i.e., the human-machine interaction input) may be input in the form of text, voice, etc. The device obtains the human-machine interaction input, which may be content expressed in a natural language. Thus, the human-machine interaction input may be converted to a corresponding human-machine interaction input vector through methods such as natural language processing, word segmentation, and word vector conversion.

In some embodiments, the process of generating a human-machine interaction input vector is the same as the process of generating an initial corpus vector according to obtained initial corpus content in the corpus generating methods, and therefore will not be elaborated again.

Step S504: determining, according to the human-machine interaction input vector, n closest corpus vectors from a preset corpus.

In some embodiments, n is a positive integer equal to or greater than one. The preset corpus at least comprises the initial corpus generated using the above-described corpus generating methods. The method for determining n closest corpus vectors from a preset corpus may include the KNN algorithm or other algorithms.

Step S506: determining a confidence level of corpus content corresponding to each of the n closest corpus vectors, and determining target corpus content according to the confidence levels.

In some embodiments, a confidence level may indicate a degree of similarity between a closest corpus vector and the human-machine interaction input vector. The confidence level may be calculated according to parameters such as keyword matching, text granularity similarity, etc.

The target corpus content may be the corpus content corresponding to the closest corpus vector that has the highest confidence level with respect to the human-machine interaction input vector (i.e., the user question vector).

Step S508: generating, according to the target corpus content, a response corresponding to the human-machine interaction input.

After the target corpus content is determined, the answer data corresponding to the target corpus content is determined, and a response corresponding to the human-machine interaction input is generated according to the answer data. For example, the target corpus content may be the question in a QA pair, and a corresponding answer may be determined according to the question.

The human-machine interaction processing method converts a human-machine interaction input (user question data) to a vector, and then determines n closest corpus vectors in a preset corpus. This way, when the n closest corpus vectors are recalled, corpus vectors with close semantics but without text co-occurrence attributes will not be lost, thereby ensuring the recall accuracy. Subsequently, a target corpus vector is determined based on a confidence level, thereby ensuring the accuracy of the answer. In addition, since the preset corpus comprises the initial corpus, and the initial corpus adopts an inverted chain index, the recall efficiency for recalling the n closest corpus vectors can be ensured and improved.

The human-machine interaction processing method according to the embodiments may be implementable by any proper terminal device or server having data processing capabilities, including but not limited to a mobile terminal, such as a tablet computer, a mobile phone, etc., and a desktop computer.

Figure 6:
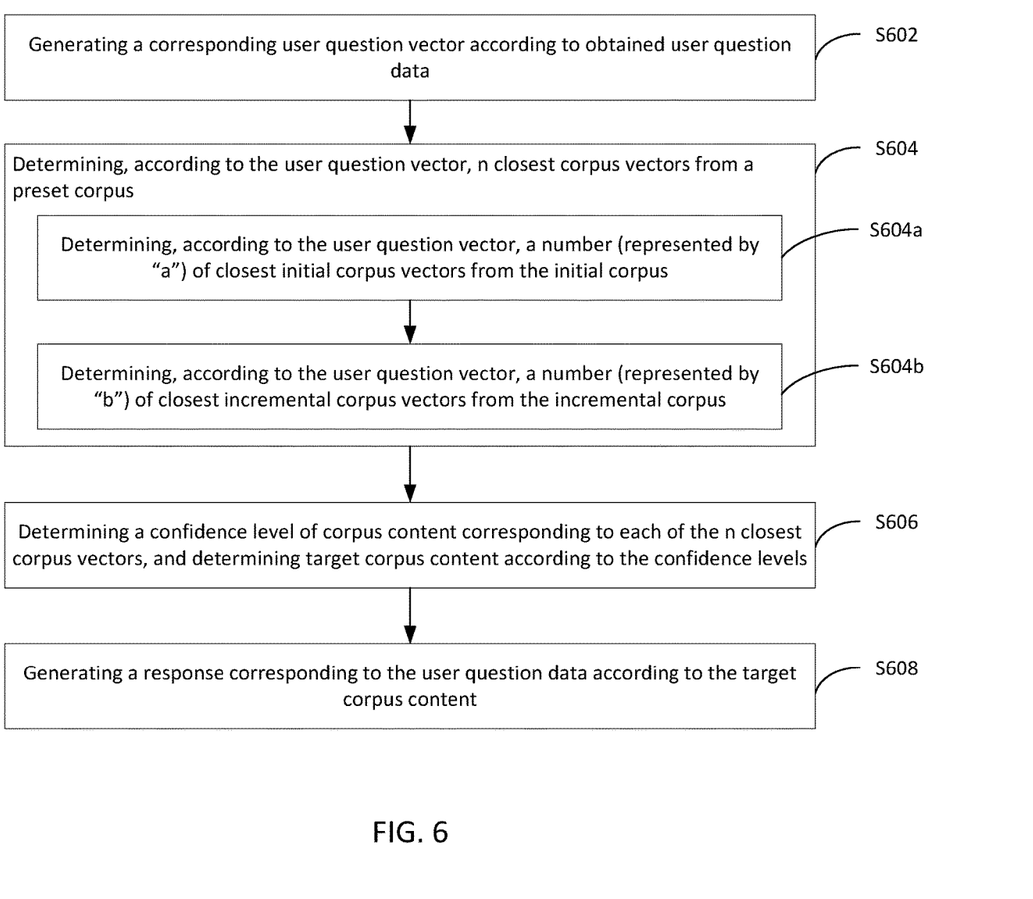
FIG. 6 is a flow chart of a human-machine interaction processing method according to other embodiments of the present specification.

Referring to FIG. 6, a flow chart of steps in a human-machine interaction processing method is illustrated according to other embodiments of the present specification. The human-machine interaction processing method is used to implement intelligent dialogues between a device and a person. For example, a chat robot chats with a user, an intelligent assistant interacts with a user, etc. Examples in which the human-machine interaction processing method is the Question and Answer method and a human-machine interaction input is the user question are taken for description. The human-machine interaction processing method according to the embodiments comprises the following steps S602-S608.

Step S602: generating a corresponding user question vector according to obtained user question data.

When a user performs Question and Answer activities with a device, human-machine interaction is conducted in the form of text, voice, etc., so as to input a user question. The device obtains the user question data expressed in a natural language. For example, the user question data is: "how is the weather in Beijing?" in the language of Chinese. This user question data may be segmented to obtain separated words, such as "Beijing"|"weather"|"how", also in the language of Chinese. Subsequently, word vectors corresponding to the words are searched for in a word vector library, and then the word vectors are added together to obtain a user question vector.

Step S604: determining, according to the user question vector, n closest corpus vectors from a preset corpus.

In some embodiments, the preset corpus may comprise the initial corpus generated using the above-described corpus generating methods, and may also comprise the incremental corpus.

The value of n in the n closest corpus vectors may be set according to practical demands. For example, n is 8, 10, etc. The value of n may alternatively be determined according to the amount of corpus content in the initial corpus, so as to ensure the recall accuracy and the recall efficiency.

If the preset corpus comprises the initial corpus, determining n closest corpus vectors comprises: accessing the inverted chain index to determine n initial corpus vectors closest to the user question vector in the initial corpus. Since the inverted chain index is used, a higher search efficiency can be achieved.

For example, the process may be as follows: dividing the user question vector into k sub-vectors, determining class centers to which the k sub-vectors belong, and then determining a vector type of the user question vector according to the class centers of the k sub-vectors; searching the inverted chain index of the initial corpus according to the vector type of the user question vector to determine n closest initial corpus vectors. For example, the class centers to which the k sub-vectors belong are class center 11, class center 357, class center 607, class center 825, class center 1111, class center 1451, class center 1651, and class center 2021, respectively, which may be recorded as [ck1, ck2, . . . ckk]. The same vector type is searched for in the inverted chain index, and then n closest corpus vectors are determined from initial corpus vectors having the same vector type.

In some embodiments, if the number of initial corpus vectors having the same vector type is smaller than n, the initial corpus vectors having the same vector type are determined to be n closest corpus vectors. If the number of initial corpus vectors having the same vector type is greater than n, n closest initial corpus vectors may be determined in a manner such as text granularity similarity, keyword matching degree, etc., as the n closest corpus vectors.

If the preset corpus comprises the initial corpus and the incremental corpus, then n may be a positive integer equal to or greater than two, and the determining n closest corpus vectors comprises the following steps S604a-S604b.

Step S604a: determining, according to the user question vector, a number (represented by "a") of closest initial corpus vectors from the initial corpus.

In some embodiments, the process of determining, according to the user question vector, "a" closest initial corpus vectors from the initial corpus is similar to the above-described process of determining n closest initial corpus vectors from the initial corpus, which, therefore, will not be elaborated here.

Step S604b: determining, according to the user question vector, a number (represented by "b") of closest incremental corpus vectors from the incremental corpus.

For example, a is a positive integer equal to or greater than one, b is a positive integer equal to or greater than one, and a+b=n.

Determining, according to the user question vector, b closest incremental corpus vectors from the incremental corpus may be, for example, as follows: searching the tile index of the incremental corpus according to the user question vector to determine b closest incremental corpus vectors. For example, the distance between the user question vector and each incremental corpus vector is calculated one by one, so as to determine b closest incremental corpus vectors.

Step S606: determining a confidence level of corpus content corresponding to each of the n closest corpus vectors, and determining a target corpus content according to the confidence levels.

In some embodiments, according to the n closest corpus vectors, n pieces of corpus content corresponding to the closest corpus vectors are determined; the text granularity similarity and keyword matching degree between the n pieces of corpus content and the user question data are calculated, respectively; determining a confidence level of each of the n pieces of corpus content according to the text granularity similarity and keyword matching degree; and determining the corpus content having the highest confidence level as the target corpus content.

In some embodiments, the text granularity similarity may be obtained by calculating Hash values, calculating Jaccard similarity, or using an NLP algorithm. After the parameters such as text granularity similarity and keyword matching degree are obtained, the confidence level of a piece of corpus content may be determined with reference to weights of the parameters.

Step S608: generating a response corresponding to the user question data according to the target corpus content.

After the target corpus content is determined, whether the confidence level of the target corpus content is equal to or greater than an answer threshold is determined. The value of the answer threshold may be determined according to practical demands, e.g., 80%, 85%, 90%, etc.

If the confidence level of the target corpus content is equal to or greater than the answer threshold, the answer data corresponding to the target corpus content is correspondingly searched for, and the answer data may be used as the answer data corresponding to the user question data. Alternatively, the answer data may be processed in a manner of generating natural language to generate the answer data corresponding to the user question data.

If the confidence level of the target corpus content is less than the answer threshold, blank answer data is generated to indicate no answer, or that further information is required.

incorrectly triggers a QA pair having completely different semantics, which affects the user experience of question answering systems, while the semantic recall manner does not cause this type of error.

In the third example 3 corresponding to the user question "I will leave first," both manners have QA results. From the perspective of answer effects, however, the accuracy of the answer in the semantic recall manner is far superior to that in the text recall manner.

With regard to the preset corpus in the human-machine interaction processing method, the question (the initial corpus content) in a QA pair is segmented, and after word vectors of the words are obtained, the corresponding word vectors are added together to generate a vector corresponding to the question (the initial corpus vector). Subsequently, an inverted chain index is generated as the corpus of vector recall, according to the initial corpus vector through Product Quantization. For the user question vector, the KNN algorithm is used to retrieve top K initial corpus vectors having the shortest distance to the user question vector, and the QA pairs corresponding to the initial corpus vectors are used as the recall result. Since the index of the corpus is an inverted chain index, the retrieval efficiency is ensured.

For the retrieved top K initial corpus vectors having the shortest distance to the user question vector, the confidence levels may be calculated based on text granularity similarity and matching degree of important keywords, and it can be determined whether the user question is answered and the corresponding answer data can also be determined both through a threshold.

Compared with the conventional text-based recall, a semantic vector index used as a recall module of the question answering system can solve the problem that data having the same semantics but different texts cannot be recalled and qualified answers may be lost in the recall phase.

Figure 7:
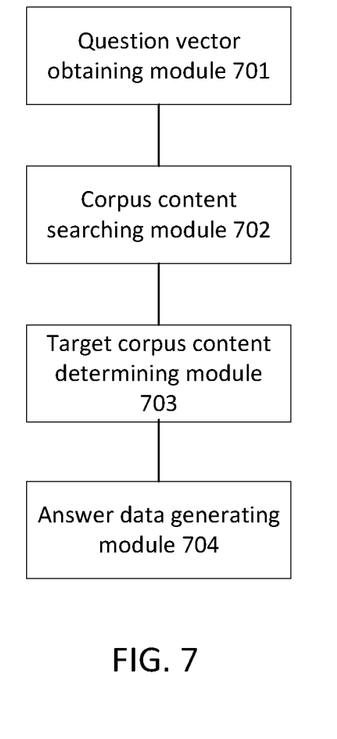
FIG. 7 is a structural block diagram of a human-machine interaction processing apparatus according to some embodiments of the present specification.

Referring to FIG. 7, a structural block diagram of a question answering apparatus is illustrated according to some embodiments of the present specification. The question answering apparatus according to the embodiments comprises: a question vector obtaining module 701 configured to generate a corresponding human-machine interaction input vector according to an obtained human-machine

TABLE 1

| User question | Text recall | | Semantic vector recall | |
| --- | --- | --- | --- | --- |
| | Question | Answer | Question | Answer |
| Tell your best joke | None | None | Tell a funny joke | Detailed content of a joke |
| Your story is not funny at all | Your joke is not funny at all | Then what kind of joke do you want to hear? | None | None |
| I will leave first | I will leave and you get off work first | Ok, bye. Hope you will chat with me again | I will leave a little early | Ok |

In Table 1, for the same user question data, answers according to current technologies in the text recall manner and answers according to the application in the semantic vector recall manner are listed.

In the first example corresponding to the user question "Tell your best joke," a QA pair that is not related to the original text but has similar semantics can be recalled, and the user question is ultimately answered.

In second example corresponding to the user question "Your story is not funny at all," the text recall manner interaction input; a corpus content searching module 702 configured to determine, according to the human-machine interaction input vector, n closest corpus vectors from a preset corpus, wherein n is a positive integer equal to or greater than one, and wherein the preset corpus at least comprises the initial corpus generated using the above-described methods; a target corpus content determining module 703 configured to determine a confidence level of corpus content corresponding to each of the n closest corpus vectors, and determine target corpus content according to the confidence levels; and an answer data generating module 704 configured to generate a response corresponding to the human-machine interaction input data according to the target corpus content.

The question answering apparatus converts the human-machine interaction input data to a human-machine interaction input vector, and then determines n closest corpus vectors from a preset corpus. This way, when the n closest corpus vectors are recalled, corpus vectors with close semantics but without text co-occurrence attributes will not be lost, thereby ensuring the recall accuracy. Subsequently, a target corpus vector is determined based on a confidence level, thereby ensuring the accuracy of the answer. In addition, since the preset corpus comprises the initial corpus, and the initial corpus adopts an inverted chain index, the recall efficiency for recalling the n closest corpus vectors can be ensured and improved.

Figure 8:
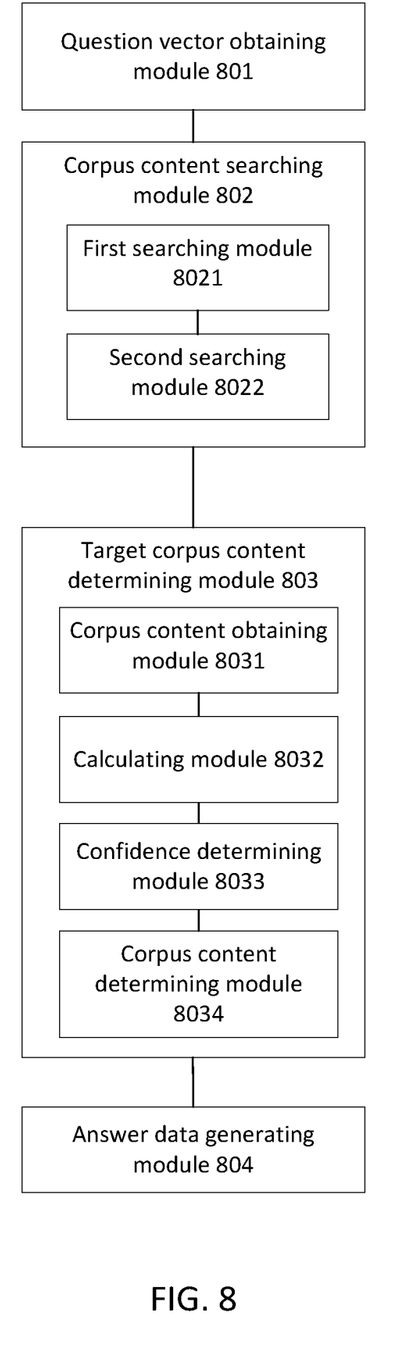
FIG. 8 is a structural block diagram of a human-machine interaction processing apparatus according to other embodiments of the present specification.

Referring to FIG. 8, a structural block diagram of a question answering apparatus is illustrated according to other embodiments of the present specification. The question answering apparatus according to the embodiments comprises: a question vector obtaining module 801 configured to generate a corresponding human-machine interaction input vector according to an obtained human-machine interaction input; a corpus content searching module 802 configured to determine, according to the human-machine interaction input vector, n closest corpus vectors from a preset corpus, wherein n is a positive integer equal to or greater than one, and wherein the preset corpus at least comprises the initial corpus generated using the above-described method; a target corpus content determining module 803 configured to determine a confidence level of corpus content corresponding to each of the n closest corpus vectors, and determine target corpus content according to the confidence levels; and an answer data generating module 804 configured to generate answer data corresponding to the human-machine interaction input data according to the target corpus content.

In some embodiments, if the preset corpus further comprises the incremental corpus, then n is a positive integer equal to or greater than two, and the corpus content searching module 802 comprises: a first searching module 8021 configured to determine, according to the human-machine interaction input vector, a number (represented by "a") of closest initial corpus vectors from the initial corpus; and a second searching module 8022 configured to determine, according to the human-machine interaction input vector, a number (represented by "b") of closest incremental corpus vectors from the incremental corpus, wherein a is a positive integer equal to or greater than one, b is a positive integer equal to or greater than one, and a+b=n.

In some embodiments, the first searching module 8021 is configured to divide the human-machine interaction input vector into k sub-vectors; determine class centers to which the k sub-vectors of the human-machine interaction input vector belong using a clustering algorithm, and then determine a vector type of the human-machine interaction input vector according to the class centers of the k sub-vectors; search the inverted chain index of the initial corpus according to the vector type of the human-machine interaction input vector, and determine "a" closest initial corpus vectors.

In some embodiments, the second searching module 8022 is configured to search the tile index of the incremental corpus according to the human-machine interaction input vector to determine b closest incremental corpus vectors.

In some embodiments, the target corpus content determining module 803 comprises: a corpus content obtaining module 8031 configured to determine, according to the n closest corpus vectors, a total of n pieces of corpus content each corresponding to one of the n closest corpus vectors; a calculating module 8032 configured to calculate the text granularity similarity and keyword matching degree between each of the n pieces of corpus content and the human-machine interaction input data, respectively; a confidence determining module 8033 configured to determine a confidence level of each of the n pieces of corpus content according to the text granularity similarity and keyword matching degree; and a corpus content determining module 8034 configured to determine the corpus content having the highest confidence level as the target corpus content.

The question answering apparatus converts the human-machine interaction input data to a human-machine interaction input vector, and then determines n closest corpus vectors from a preset corpus. This way, when the n closest corpus vectors are recalled, corpus vectors with close semantics but without text co-occurrence attributes will not be lost, thereby ensuring the recall accuracy. Subsequently, a target corpus vector is determined based on a confidence level, thereby ensuring the accuracy of the answer. In addition, since the preset corpus comprises the initial corpus, and the initial corpus adopts an inverted chain index, the recall efficiency for recalling the n closest corpus vectors can be ensured and improved.

Figure 9:
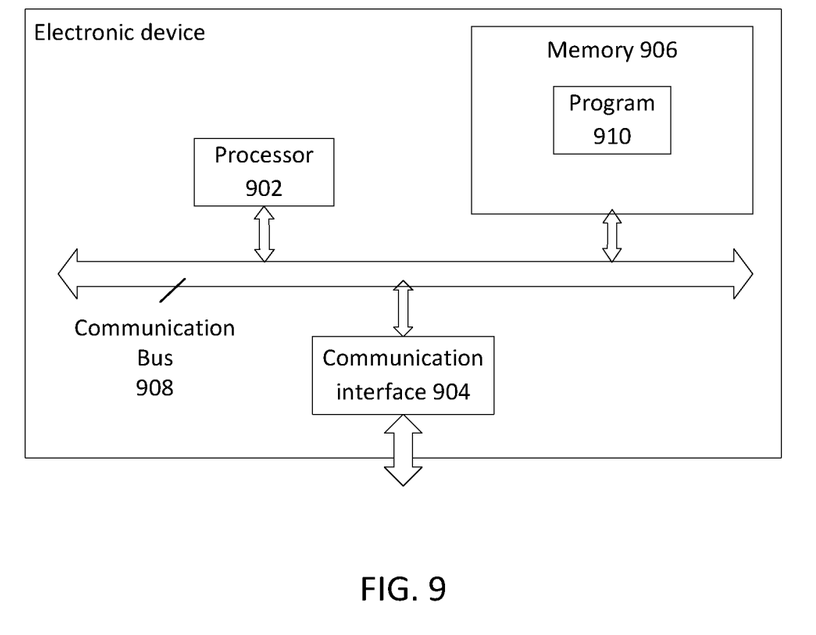
FIG. 9 is a schematic structural diagram of an electronic device according to some embodiments of the present specification.

Referring to FIG. 9, a schematic structural diagram of an electronic device is illustrated according to some embodiments of the present specification. The embodiments of the present specification do not limit implementations of the electronic device. As shown in FIG. 9, the electronic device may comprise: a processor 902, a communication interface 904, a memory 906, and a communication bus 908.

In some embodiments, the processor 902, the communication interface 904, and the memory 906 communicate with one another via the communication bus 908. The communication interface 904 is configured to communicate with other electronic devices. The processor 902 is configured to execute a program 910, and for example, to execute relevant steps in the above embodiments of the methods. In one example, the program 910 may comprise program code, and the program code comprises computer operation instructions.

The processor 902 may be a Central Processing Unit (CPU), an Application Specific Integrated Circuit (ASIC), or one or more integrated circuits configured to implement embodiments of the present specification. One or more processors comprised in an electronic device may be processors of the same type, e.g., one or more CPUs, or may be processors of different types, e.g., one or more CPUs and one or more ASICs.

The memory 906 is configured to store the program 910. The memory 906 may comprise high-speed RAM, and may also comprise a non-volatile memory, e.g., at least one magnetic disk memory. For example, the program 910 may be configured to cause the processor 902 to execute the following operations: generating an initial corpus vector according to obtained initial corpus content, and determining a vector type of each initial corpus vector; and generating, according to the vector types and the initial corpus vectors, an initial corpus having an inverted chain index.

In some embodiments, the program 910 may be further configured to cause the processor 902 to, when generating an initial corpus vector according to the obtained initial corpus content, determine a word segmentation result of the initial corpus content and word vectors corresponding to the words in the word segmentation result; and generate an initial corpus vector according to the word vectors corresponding to the words in the word segmentation result.

In some embodiments, the program 910 may be further configured to cause the processor 902 to, when determining word vectors corresponding to the words in the word segmentation result, search a preset word vector library to determine word vectors corresponding to the words in the word segmentation result.

In some embodiments, the program 910 may be further configured to cause the processor 902 to, when generating an initial corpus vector according to the word vectors corresponding to the words in the word segmentation result, for the word segmentation result, sum the word vectors corresponding to the words in the word segmentation result to generate an initial corpus vector corresponding to the initial corpus content.

In some embodiments, the program 910 may be further configured to cause the processor 902 to, when determining the vector type of each initial corpus vector, determine the vector type of each initial corpus vector through Product Quantization.

In some embodiments, the program 910 may be further configured to cause the processor 902 to, when determining the vector type of each initial corpus vector through Product Quantization, divide each initial corpus vector into k sub-vectors, and form k sub-vector sets; cluster each of the sub-vector sets using a clustering algorithm, and generate m class centers for each of the sub-vector sets; for each initial corpus vector, determine a class center to which each sub-vector of the initial corpus vector belongs; and determine a vector type of the initial corpus vector according to the class centers to which the k sub-vectors of the initial corpus vector belong.

In some embodiments, the program 910 may be further configured to cause the processor 902 to, when generating, according to the vector types and the initial corpus vectors, an initial corpus having an inverted chain index, use initial corpus vectors having the same vector type and the corresponding vector type as one piece of record data of an inverted chain index to generate the initial corpus having the inverted chain index according to the record data.

In some embodiments, the program 910 may be further configured to cause the processor 902 to generate a corresponding incremental corpus vector according to an obtained incremental corpus content, and generate, according to the incremental corpus vectors, an incremental corpus having a tile index, the initial corpus and the incremental corpus forming a corpus.

Alternatively, the program 910 may be, for example, configured to cause the processor 902 to execute the following operations: generating a corresponding human-machine interaction input vector according to obtained human-machine interaction input data; determining, according to the human-machine interaction input vector, n closest corpus vectors from a preset corpus, wherein n is a positive integer equal to or greater than one, and wherein the preset corpus at least comprises the initial corpus generated using the above-described corpus generating methods; determining a confidence level of corpus content corresponding to each of the n closest corpus vectors, and determining a target corpus content according to the confidence levels; and generating answer data corresponding to the human-machine interaction input data according to the target corpus content.

In some embodiments, the program 910 may be further configured to cause the processor 902 to, if the preset corpus further comprises the incremental corpus and n is a positive integer equal to or greater than two, and when determining, according to the human-machine interaction input vector, n closest initial corpus vectors from the preset corpus, determine, according to the human-machine interaction input vector, a number (represented by "a") of closest initial corpus vectors from the initial corpus; and determine, according to the human-machine interaction input vector, a number (represented by "b") of closest incremental corpus vectors from the incremental corpus, wherein a is a positive integer equal to or greater than one, b is a positive integer equal to or greater than one, and a+b=n.

In some embodiments, the program 910 may be further configured to cause the processor 902 to, when determining, according to the human-machine interaction input vector, a number (represented by "a") of closest initial corpus vectors from the initial corpus, divide the human-machine interaction input vector into k sub-vectors; determine class centers to which the k sub-vectors of the human-machine interaction input vector belong using a clustering algorithm, and then determine a vector type of the human-machine interaction input vector according to the class centers of the k sub-vectors; search the inverted chain index of the initial corpus according to the vector type of the human-machine interaction input vector, and determine a number (a) of closest initial corpus vectors.

In some embodiments, the program 910 may be further configured to cause the processor 902 to, when determining, according to the human-machine interaction input vector, a number (b) of closest incremental corpus vectors from the incremental corpus, search the tile index of the incremental corpus according to the human-machine interaction input vector to determine b closest incremental corpus vectors.

In some embodiments, the program 910 may be further configured to cause the processor 902 to, when determining a confidence level of corpus content corresponding to the n closest corpus vectors and determining target corpus content according to the confidence levels, determine, according to the n closest corpus vectors, a total of n pieces of corpus content each corresponding to one the n closest corpus vectors; calculate a text granularity similarity and keyword matching degree between each of the n corpus content and the human-machine interaction input data, respectively; determine the confidence level of each of the n pieces of corpus content according to the text granularity similarity and keyword matching degree; and determine the corpus content having the highest confidence as the target corpus content.

The electronic device according to the embodiments can generate an initial corpus having an inverted chain index, achieving higher search efficiency and improving a response speed of question answering systems using this initial corpus due to the inverted chain index structure of the initial corpus and through storing initial corpus vectors having the same vector types into groups (clusters). In addition, due to vectorization of the initial corpus content when generating the initial corpus vectors, semantic similarity in the initial corpus content can be well reflected when vector types of the initial corpus vectors are determined, thereby fundamentally solving the problem in current technologies that semantic similarity cannot be reflected in initial corpus content that do not have text co-occurrence attributes, and improving answer accuracy of question answering systems subsequently using this initial corpus.

The electronic device according to the embodiments converts the human-machine interaction input data to a human-machine interaction input vector, and then determines n closest corpus vectors from a preset corpus using the KNN algorithm. This way, when the n closest corpus vectors are recalled, corpus vectors with close semantics but without text co-occurrence attributes will not be lost, thereby ensuring the recall accuracy. Subsequently, a target corpus vector is determined based on a confidence level, thereby ensuring the accuracy of the answer. In addition, since the preset corpus comprises the initial corpus, and the initial corpus adopts an inverted chain index, the recall efficiency for recalling the n closest corpus vectors using the KNN algorithm can be ensured and improved.

It should be noted that each part or step described in the embodiments of the present specification may be divided into more parts or steps, or two or more parts or steps or some operations of the parts or steps may be combined into a new part or step, to achieve the goal of the embodiments of the present specification.

The above methods according to the embodiments of the present specification may be implemented in hardware and firmware, or may be implemented as software or computer code stored in a storage medium (e.g., CD ROM, RAM, a floppy disk, a hard disk, or a magneto-optical disk), or may be implemented as computer code that is downloaded from the Internet, originally stored in a remote storage medium or non-transient machine readable medium, and will be stored in a local storage medium. Therefore, the method described in the specification may be processed by software stored on a storage medium for a general-purpose computer, a special-purpose computer, or a programmable or special-purpose hardware (e.g., ASIC or FPGA). It should be understood that the computer, the processor, a controller of a micro-processor, or programmable hardware comprises a storage component capable of storing or receiving software or computer code (e.g., RAM, ROM, flash memory, etc.). When the software or computer code is accessed and executed by the computer, the processor, or the hardware, the corpus generating methods or the human-machine interaction processing methods described in the specification are implemented. In addition, when a general-purpose computer accesses the code used for implementing the corpus generating method or the human-machine interaction processing method illustrated in the specification, the execution of the code transforms the general-purpose computer into a special-purpose computer for implementing the corpus generating methods or the human-machine interaction processing methods illustrated in the specification.

One of ordinary skill in the art should understand that the units and method steps in each example described with reference to the embodiments of the present specification may be implemented by electronic hardware or a combination of computer software and electronic hardware. Whether these functions are implemented in a hardware manner or a software manner depends on applications and design restrictions of the technical solutions. One of ordinary skill in the art may implement the described functions using different methods for each application, but such implementation may not be deemed exceeding the scope of the embodiments of the application.

The above-described implementation manners are only used to describe the embodiments of the application, rather than limiting the embodiments of the application. Various modifications and variations may be made by one of ordinary skill in the art without departing from the spirit and scope of the embodiments of the application. Therefore, all equivalent technical solutions shall fall in the scope of the embodiments of the application, and the protection scope of the embodiments of the application shall be subject to the claims.

What is claimed is:

1. A corpus generating method, implementable by a computing device, the method comprising:
   generating a corpus vector according to corpus content;
   determining a vector type of the corpus vector, wherein the determining comprises calculating a distance between the corpus vector and each of a plurality of class center points and determining the vector type of the corpus vector as a vector type represented by one of the class center points having the smallest distance to the corpus vector; and
   generating, according to the vector type and the corpus vector, a corpus having an inverted chain index, wherein the inverted chain index comprises a plurality of items, each item comprising an attribute value and one or more addresses of one or more records having the attribute value, and wherein, for at least one of the items, the attribute value of the item comprises the determined vector type and the one or more addresses of the one or more records of the item comprise an address of the generated corpus vector.

2. The method according to claim 1, wherein the generating a corpus vector according to corpus content comprises:
   determining a word segmentation result of the corpus content, the word segmentation result including a plurality of words;
   determining word vectors corresponding to the words in the word segmentation result; and
   generating the corpus vector corresponding to the corpus content according to the word vectors corresponding to the words in the word segmentation result.

3. The method according to claim 2, wherein the determining word vectors corresponding to the words in the word segmentation result comprises: searching a preset word vector library to determine the word vectors corresponding to the words in the word segmentation result.

4. The method according to claim 2, wherein the generating the corpus vector corresponding to the corpus content according to the word vectors corresponding to the words in the word segmentation result comprises:
   summing the word vectors corresponding to the words in the word segmentation result to generate the corpus vector.

5. The method according to claim 1, wherein the determining a vector type of the corpus vector comprises: determining the vector type of the corpus vector through Product Quantization.

6. The method according to claim 5, further comprising generating a plurality of corpus vectors, and wherein the determining the vector type of the corpus vector through Product Quantization comprises:
   dividing each of the plurality of corpus vectors into k sub-vectors, and forming k sub-vector sets, wherein k is a positive integer equal to or greater than one;
   clustering each of the sub-vector sets using a clustering algorithm, and generating m class centers for each of the sub-vector sets, wherein m is a positive integer equal to or greater than one;
   determining a class center to which each sub-vector of each corpus vector belongs; and
   determining a vector type of the corpus vector according to the class centers to which the k sub-vectors of the each corpus vector belong.

7. The method according to claim 6, wherein the generating, according to the vector type and the corpus vector, a corpus having an inverted chain index comprises:

generating the corpus having the inverted chain index according to record data, each piece of the record data including corpus vectors having a same vector type and the corresponding vector type.

8. The method according to claim 1, further comprising:
generating an incremental corpus vector according to incremental corpus content;
generating an incremental corpus having a tile index according to the incremental corpus vector; and
forming a new corpus based on the corpus and the incremental corpus.

9. A corpus generating apparatus, comprising: one or more processors and one or more non-transitory computer-readable memories coupled to the one or more processors and configured with instructions executable by the one or more processors to cause the apparatus to perform operations comprising:
generating a corpus vector according to corpus content;
determining a vector type of the corpus vector, wherein the determining comprises calculating a distance between the corpus vector and each of a plurality of class center points and determining the vector type of the corpus vector as a vector type represented by one of the class center points having the smallest distance to the corpus vector; and
generating, according to the vector type and the corpus vector, a corpus having an inverted chain index, wherein the inverted chain index comprises a plurality of items, each item comprising an attribute value and one or more addresses of one or more records having the attribute value, and wherein, for at least one of the items, the attribute value of the item comprises the determined vector type and the one or more addresses of the one or more records of the item comprise an address of the generated corpus vector.

10. The apparatus according to claim 9, wherein the generating a corpus vector according to corpus content comprises:
determining a word segmentation result of the corpus content, the word segmentation result including a plurality of words;
determining word vectors corresponding to the words in the word segmentation result; and
generating the corpus vector corresponding to the corpus content according to the word vectors corresponding to the words in the word segmentation result.

11. The apparatus according to claim 10, wherein the determining word vectors corresponding to the words in the word segmentation result comprises: searching a preset word vector library to determine the word vectors corresponding to the words in the word segmentation result.

12. The apparatus according to claim 10, wherein the generating the corpus vector corresponding to the corpus content according to the word vectors corresponding to the words in the word segmentation result comprises:
summing the word vectors corresponding to the words in the word segmentation result to generate the corpus vector.

13. The apparatus according to claim 9, wherein the determining a vector type of the corpus vector comprises: determining the vector type of the corpus vector through Product Quantization.

14. The apparatus according to claim 13, wherein the operations further comprise: generating a plurality of corpus vectors, and wherein the determining the vector type of the corpus vector through Product Quantization comprises:
dividing each of the plurality of corpus vectors into k sub-vectors, and forming k sub-vector sets, wherein k is a positive integer equal to or greater than one;
clustering each of the sub-vector sets using a clustering algorithm, and generating m class centers for each of the sub-vector sets, wherein m is a positive integer equal to or greater than one;
determining a class center to which each sub-vector of each corpus vector belongs; and
determining a vector type of the corpus vector according to the class centers to which the k sub-vectors of the each corpus vector belong.

15. The apparatus according to claim 14, wherein the generating, according to the vector type and the corpus vector, a corpus having an inverted chain index comprises:
generating the corpus having the inverted chain index according to record data, each piece of the record data including corpus vectors having a same vector type and the corresponding vector type.

* * * * *